United States Patent [19]

Alexander et al.

[11] 4,449,695
[45] May 22, 1984

[54] FIRE SAFE PLUG VALVE

[75] Inventors: William H. Alexander; Roy R. Dare, both of Houston, Tex.

[73] Assignee: Vapor Corporaion, Chicago, Ill.

[21] Appl. No.: 409,430

[22] Filed: Aug. 19, 1982

[51] Int. Cl.³ ............................................. F16K 31/44
[52] U.S. Cl. ...................................... 251/214; 137/72; 277/DIG. 6; 277/58; 277/177; 251/312
[58] Field of Search ............... 251/309, 312, 314, 214; 137/72; 277/DIG. 6, 177, 58, 59

[56] References Cited

U.S. PATENT DOCUMENTS

| | | | |
|---|---|---|---|
| 3,326,516 | 6/1967 | Sachnik | 251/214 |
| 3,595,585 | 7/1971 | Bristow | 277/58 |
| 4,245,661 | 1/1981 | McGee | 251/214 |
| 4,249,555 | 2/1981 | Scaramucci | 137/72 |
| 4,273,148 | 6/1981 | Charland | 137/72 |
| 4,305,567 | 12/1981 | Lunt | 277/DIG. 6 |
| 4,379,557 | 4/1983 | Saka | 277/59 |

Primary Examiner—A. Michael Chambers
Attorney, Agent, or Firm—Francis J. Lidd

[57] ABSTRACT

A valve for controlling the flow of fluids of a flammable nature and under high pressure, which includes a hollow body having a plug rotatably mounted within the body between the floating seats at inlet and outlet ports with a packing plate in the bonnet capable of maintaining a seal against loss of fluids when the valve has been subjected to high temperature caused by fire.

2 Claims, 5 Drawing Figures

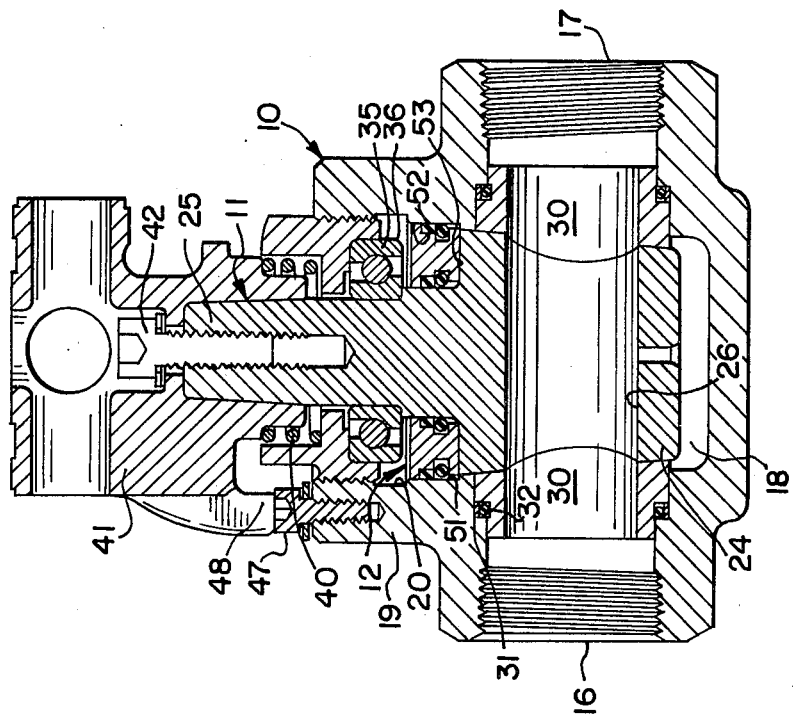
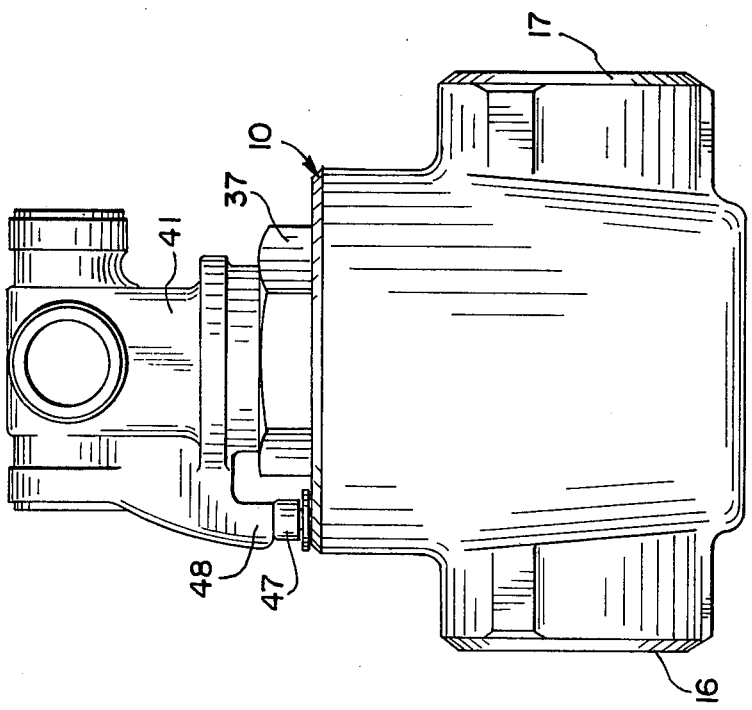

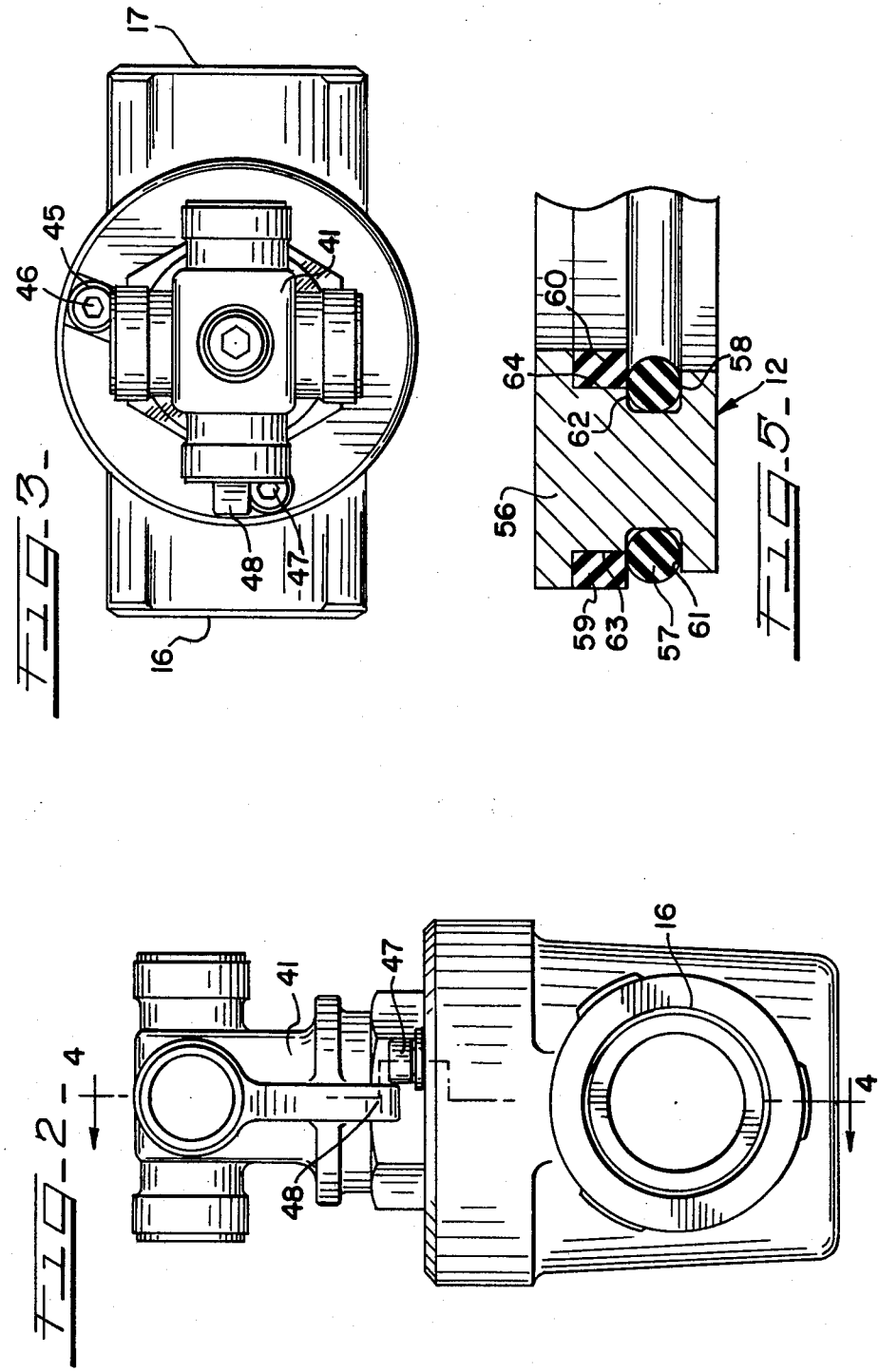

FIRE SAFE PLUG VALVE

This invention relates in general to a high pressure plug valve for controlling the flow of fluids, and more particularly to a valve capable of withstanding high temperature conditions caused by fire without leaking, and still more particularly to a firesafe high pressure plug valve for handling highly corrosive and flammable liquids.

Heretofore, it has been well known to provide high pressure plug valves for handling the flow of liquids under high pressure. These valves and the valve of the present invention are especially useful in controlling the flow of petroleum products. An example of the type of valve heretofore known is shown in U.S. Pat. No. 3,326,516. However, this patented valve and other high pressure plug valves have not been capable of being firesafe because the packing or seals used cannot withstand high temperatures without failing.

The American Petroleum Institute has developed standards for determining whether a valve is firesafe. This test is identified in an October, 1978 publication identified as API RP 6F. The test procedure determining whether a valve is fire save involves subjecting the valve to a flame having a temperature of 1400 to 1600 degrees F. for a duration of fifteen or thirty minutes, after which leakage is measured, both while the valve is in open and in closed positions. If leakage does not exceed a given amount, it satisfies the test. The valve of the present invention has successfully passed the tests, so that it is rated as a firesafe valve.

It is therefore an object of the present invention to provide a high pressure plug valve for controlling the flow of liquids which is firesafe and has passed the tests issued by the American Petroleum Institute.

Another object of the present invention is in the provision of a high pressure plug valve for controlling the flow of flammable and corrosive liquids having a unique packing plate assembly which seals against leakage in the bonnet and which is capable of withstanding high temperatures caused by flame such that it can still pass the leakage tests issued by the American Petroleum Institute.

Other objects, features and advantages of the invention will be apparent from the following detailed disclosure, taken in conjunction with the accompanying sheets of drawings, wherein like reference numerals refer to like parts, in which:

FIG. 1 is a side elevational view of the valve of the present invention;

FIG. 2 is an end elevational view of the valve;

FIG. 3 is a top plan view of the valve;

FIG. 4 is a vertical sectional view taken substantially along line 4—4 of FIG. 3; and FIG. 5 is an enlarged sectional view taken through the packing plate assembly.

The valve of the present invention generally includes a hollow body 10, a plug and stem assembly 11 rotatably mounted within the body, and a packing plate assembly 12.

The body 10 includes inlet and outlet ports 16 and 17 in coaxial alignment and between which is a plug chamber 18. A bonnet 19 extends upwardly from the inlet and outlet ports along an axis that is perpendicular to the axis of the ports and defines a bore 20 through which the plug and stem assembly extends.

The plug and stem assembly 11 includes a plug 24 disposed between the inlet and outlet ports and a stem 25 extending through the bonnet bore 20 and terminating exteriorly of the bonnet 19. The plug includes a passageway 26 which is aligned with the ports when the valve is in open position and extends perpendicular to the axis of the ports when it is in closed position. The outer face of the plug is slightly tapered and slidably fits between floating seats 30. One of the seats is at the inlet port and the other is at the outlet port. It should be further appreciated that inasmuch as the valve is symmetrically arranged and there is no difference between the inlet and outlet ports, either of the ports may function as the inlet or the outlet.

The floating seats 30 are held in position by the plug 24. Each seat has stepped portions for mating with stepped bores of the ports and maintained in position by an annular metal spacer 31 to define an annular packing chamber for receiving an O-ring seal 32 of a suitable resilient material to prevent leakage between the seats and the body. The inlet and outlet ports may be threaded as illustrated to receive a threaded pipe or they may be otherwise formed to receive a pipe that may be otherwise connected to the valve body.

The stem 25 of the plug stem assembly 11 is bearingly mounted in the bonnet 19 by a bearing 35. While the bearing illustrated is of a ball-bearing type, it may be appreciated that it may be of other types such as a roller bearing. The inner race of the bearing 35 is seated on the stem 25 and bears at its lower end against a shoulder 36. The outer race is engaged by a retaining nut 37 which retains the bearing in place with respect to the stem 25 and also retains the stem plug assembly 11 in place within the valve body. Accordingly, the stem is bearingly mounted within the bonnet. While the plug with its tapered fit to the seats 30 maintains its position with respect to the bearing 35, a coil spring 40 bottoming at one end on a shoulder of the retaining nut 37 and at the other end on a shoulder formed on a wrench element 41 that is secured in place for corotation with the stem plug assembly 11 by means of a screw fastener 42 to resiliently urge the stem plug assembly 11 upwardly into engagement with the bearing 35.

A lock plate 45 mounted on the bonnet 19 by a screw 46 prevents rotation of the retaining nut once it is in a desired position. Also mounted on the bonnet 19 is a stop screw 47 which coacts with a stop 48 formed on the wrench element 41 to indicate the open position of the valve. Closed position is indicated when the stop 48 abuts the lock plate screw 46.

The packing plate assembly 12 seals between the opposing bonnet surface 51 and the stem surface 52. These surfaces are essentially in parallel relation to each other. Further, the packing plate assembly 12 floats between the underside of the bearing 35 and the top surface 53 of the plug 24. When the valve is under pressure, leakage between the mating surfaces of the seats and the plug causes fluid pressure against the underside of the packing plate assembly and forces it up against the bearing 35.

The packing plate assembly 12 includes an annular packing plate 56 made of a suitable material, resilient O-ring seals or gaskets 57 and 58, and non-resilient high temperature Grafoil seals 59 and 60. Grafoil is a registered trademark of Union Carbide Corporation and is an all-graphite packing which does not contain any resin binders or inorganic fillers. It has exceptional resistance to corrosion and high temperatures. Grafoil packings or seals are made by Crane Packing Company of Morton Grove, Ill. The opposed vertical faces of the packing plate 56 are formed to accommodate the resilient and non-resilient seals. At the lower part of these faces annular grooves 61 and 62 serve to receive the resilient seals 57 and 58, respectively. Directly above these grooves are annular notches 63 and 64 which respectively receive the non-resilient seals 59 and 60. That portion of the vertical faces directly above the notches is of such a width as to substantially fill the spacing between the bonnet and the stem but allowing such tolerances as needed to permit easy rotational movement of the stem within the valve body.

In operation, the resilient O-ring seals, due to high pressure product leakage into the cavity above the plug, move against the lower surfaces of the Grafoil seals, thus conforming the non-resilient high temperature seals to define a high pressure seal between the packing plate and the bonnet and stem surfaces. Subsequent to fire testing of the valve where it is subjected to high temperatures by being enveloped in flame, it is possible that the resilient O-ring seals may be destroyed. However, the non-resilient Grafoil packing withstands the high temperatures and provides an adequate seal for the valve to inhibit leakage. Accordingly, the valve passes the fire test and is firesafe.

It will be understood that modifications and variations may be effected without departing from the scope of the novel concepts of the present invention, but it is understood that this application is to be limited only by the scope of the appended claims.

The invention is hereby claimed as follows:

1. In a high pressure plug valve including a hollow body with opposed inlet and outlet ports adapted to be connected to pipeline to control high pressure fluid flow and a bonnet extending perpendicular to said body, seats at said openings, a plug rotatably mounted in said body between said seats, a stem extending upward from said plug and bearingly received in the bonnet and extending out of the body for wrench engagement to rotate the plug between open and closed positions, and a packing plate above the plug and in the bonnet to seal between the body and the stem, the improvement in the packing plate which includes an annular metal ring with O-ring grooves opposite the respective surfaces of the body and stem to be sealed and on the plug side of the stem, resilient O-rings in each of said grooves, notches in the metal ring above each of the O-ring grooves, and nonresilient high temperature graphite ring seals along each of said notches directly backing up each of the O-rings, whereby the fluid under pressure in the valve body which leaks by the mating surfaces of the plug and seats causes the O-rings and ring seals to coact and seal between the metal ring and adjacent bonnet and stem surfaces.

2. The packing plate defined by claim 1, wherein said ring seals are Grafoil.

* * * * *